US007025929B2

(12) United States Patent
Trasorras et al.

(10) Patent No.: US 7,025,929 B2
(45) Date of Patent: Apr. 11, 2006

(54) METHOD AND APPARATUS FOR DENSIFYING POWDER METAL GEARS

(75) Inventors: Juan R. L. Trasorras, Ann Arbor, MI (US); Eric T. Riley, Troy, OH (US)

(73) Assignee: PMG Ohio Corp., Dayton, OH (US)

( * ) Notice: Subject to any disclaimer, the term of this patent is extended or adjusted under 35 U.S.C. 154(b) by 0 days.

(21) Appl. No.: 10/821,014

(22) Filed: Apr. 8, 2004

(65) Prior Publication Data

US 2005/0226759 A1 Oct. 13, 2005

(51) Int. Cl.
*B22F 3/24* (2006.01)

(52) U.S. Cl. .......................................... 419/28; 425/78

(58) Field of Classification Search .................. 419/28; 425/78

See application file for complete search history.

(56) References Cited

U.S. PATENT DOCUMENTS

| | | | | |
|---|---|---|---|---|
| 2,542,912 A | | 2/1951 | Ensign | 29/34 |
| 4,483,820 A | | 11/1984 | Schelb | 419/28 |
| 4,770,572 A | | 9/1988 | Ohkawa et al. | 409/60 |
| 4,924,690 A | | 5/1990 | Kanamaru et al. | 72/343 |
| 5,366,363 A | | 11/1994 | Good et al. | 425/78 |
| 5,390,414 A | | 2/1995 | Lisowsky | 29/893.34 |
| 5,659,955 A | | 8/1997 | Plamper | 29/893.32 |
| 5,711,187 A | | 1/1998 | Cole et al. | 74/434 |
| 5,729,822 A | | 3/1998 | Shivanath et al. | 428/551 |
| 5,961,260 A | | 10/1999 | Käsler et al. | 409/25 |
| 5,996,229 A | | 12/1999 | Yang | 29/893.34 |
| 6,004,120 A | | 12/1999 | Matsubara | 425/78 |
| 6,013,225 A | * | 1/2000 | Cadle et al. | 419/29 |
| 6,044,555 A | | 4/2000 | Jacob | 29/893.34 |
| 6,110,419 A | * | 8/2000 | Buckley-Golder et al. | 419/28 |
| 6,168,754 B1 | | 1/2001 | Woolf | 419/28 |
| 6,401,562 B1 | * | 6/2002 | De' Stefani | 74/462 |
| 6,517,772 B1 | | 2/2003 | Woolf | 419/28 |
| 6,592,809 B1 | | 7/2003 | Anderson et al. | 419/28 |
| 2003/0035747 A1 | * | 2/2003 | Anderson et al. | 419/25 |
| 2004/0065164 A1 | * | 4/2004 | Arlt et al | 74/462 |

* cited by examiner

*Primary Examiner*—Daniel Jenkins
(74) *Attorney, Agent, or Firm*—Metz Lewis LLC; Barry I. Friedman, Esq.

(57) ABSTRACT

The invention provides a method and apparatus for densifying the teeth of a powder metal preform gear. The die includes an aperture for receiving a body of the gear and a plurality of grooves for receiving the teeth of the gear. The grooves have a length and a variable width along the length. The grooves narrow tangentially relative to the aperture. The powder metal preform gear is urged through the die and the teeth are plastically and elastically deformed at a relatively narrow portion of the groove. After passing through the narrow portion of the groove and being compressed, the teeth can at least partially recover. The grooves defined by the die can be helical for forming a helical groove.

17 Claims, 3 Drawing Sheets

METHOD AND APPARATUS FOR DENSIFYING POWDER METAL GEARS

BACKGROUND OF THE INVENTION

1. Technical Field

This invention relates to post-sintering densification of powder metal preforms such as gears and the like.

2. Related Prior Art

Powder metal gears and other powder metal components have long offered a low-cost alternative for wrought components. Powder metal forming eliminates the high cost associated with machining. However, traditionally prepared powder metal components have not exhibited sufficient strength and dimensional tolerances necessary to serve as low-cost alternatives to applications requiring high strength, such as transmission gears.

Increasing the density of the compacted and sintered of a powder metal component can increase its strength. One technique previously known to increase the density of sintered powder metal components is to roll form the components. For example, a powder metal gear can be rolled between forming dies to increase the density of the component, especially at the surface, as shown in U.S. Pat. No. 5,711,187. One disadvantage of roll forming is that the density of the powder metal component may not be uniform after the roll forming process. This problem can be somewhat alleviated by reverse roll forming; however, the additional processing steps associated with reverse roll forming add cost and complexity to the process and may not eliminate the problem.

Powder metal components can also be subjected to impact forging to increase density. U.S. Pat. Nos. 2,542,912 and 5,009,842 describe impact forging in greater detail. During impact forging, the powder metal component is urged through an opening of a forming die which shapes the component. The forming die has a closed end and the component is pressed against the closed end to enhance or complete densification. The densified component is removed from the open end of the forming die. Impact forging is generally not amenable to high volume manufacturing.

SUMMARY OF THE INVENTION

The present invention provides a method and apparatus for densifying a powder metal component such as a helical gear. The method includes the step of sintering a compacted powder metal preform having a body and a plurality of teeth projecting from the body. The powder metal preform can be shaped as a gear such as a spur gear or a helical gear. The method also includes the step of squeezing each of the teeth of the preform in a direction tangential to the body. The teeth can be squeezed transversely to densify the teeth and increase the strength of the powder metal component.

The invention also provides an apparatus for squeezing the teeth of the preform. In particular, the invention provides a die defining an aperture and a plurality of grooves. The aperture of the die can receive the body of the preform and the grooves can individually receive the teeth. The grooves extend outwardly from the aperture and define a length and width.

The width of each individual groove varies along the length. In particular, the grooves include a narrowed or necked portion along the length. The powder metal preform can be moved through the die to squeeze each of the teeth in a direction tangential to the body of the powder metal preform. Specifically, each tooth can be squeezed at the narrow portion of the groove. The preform can be axially moved and rotated during movement through the die when the preform is shaped as a helical gear.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
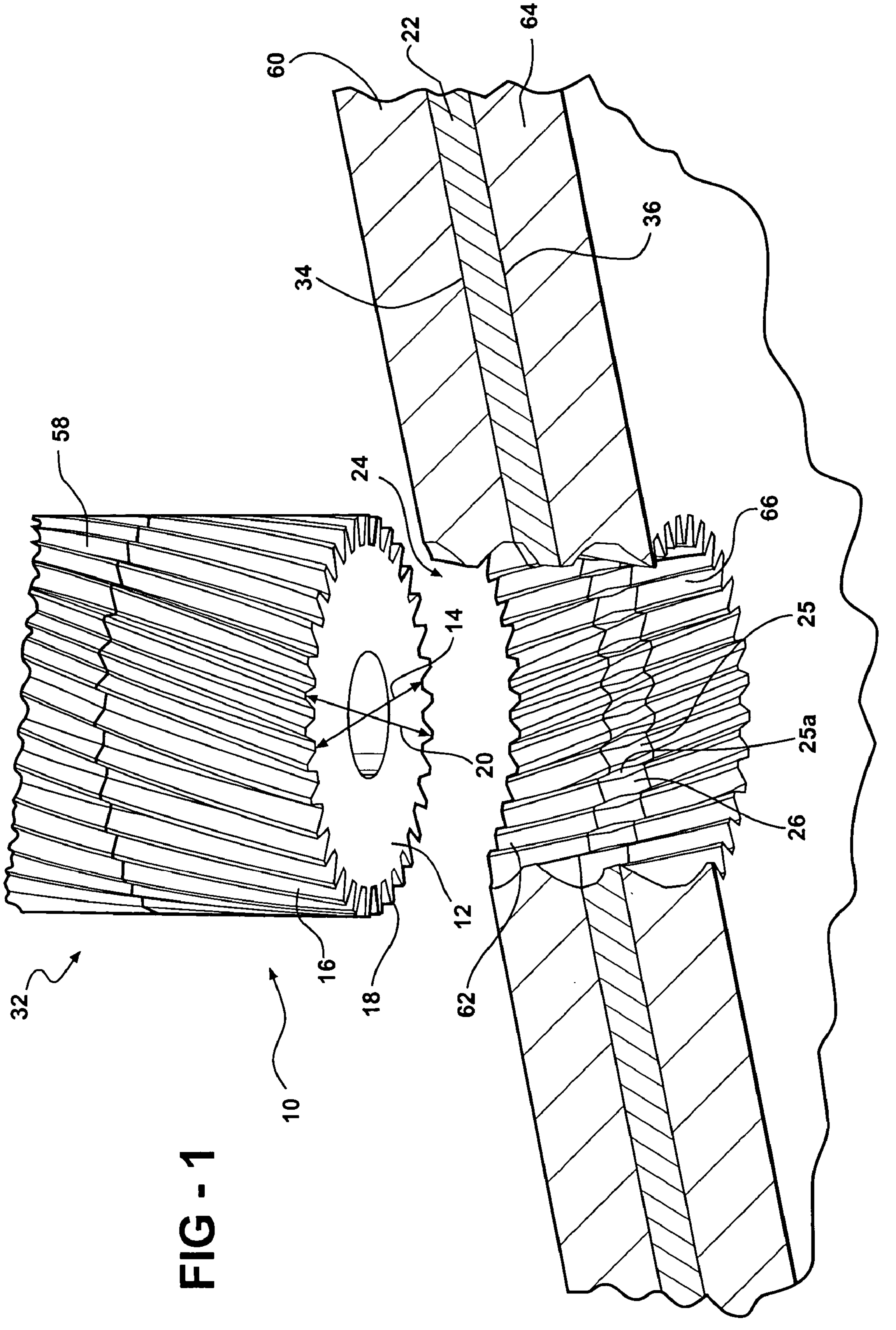
FIG. 1 is a perspective, partial cross-sectional view of a powder metal preform and a die according to an embodiment of the invention.

The present invention provides a method for producing powder metal articles. The method includes the step of sintering a compacted a powder metal preform 10 having a cylindrical body 12 with a body diameter 14. The preform 10 also includes a plurality of teeth 16 projecting from the cylindrical body 12 to tips 18. The plurality of tips 18*a* define a tip diameter 20.

The present invention also includes the step of squeezing each of the teeth 16 across each tooth 16 in a direction tangential with respect to the cylindrical body 12. During the squeezing step, the body and tip diameters 14, 20 can be substantially maintained. During squeezing, each of the teeth 16 is plastically and elastically deformed in direction transverse to a longitudinal axis of the individual tooth 16. The squeezing of the teeth 16 increases the densification of the teeth 16.

The method of the present invention can also include additional steps, such as radially squeezing the plurality of teeth 16 and the cylindrical body 12 as disclosed in U.S. Pat. No. 6,168,754, which is hereby incorporated by reference in its entirety.

The present invention also provides a squeezing device 32 for performing the squeezing step. The squeezing device 32 includes a die 22 for receiving and shaping the powder metal preform 10. The die 22 can be fabricated from tool steel or any other suitable material employed for forming dies. The die 22 includes a top surface 34 and a bottom surface 36. An aperture 24 extends between the top and bottom surfaces 34, 36. The die 22 can include a transition between one or both of the top and bottom surfaces 34, 36 and the aperture 24, such as a rounded portion or a chamfer 44.

A plurality of grooves 26 extend radially outwardly from the aperture 24. Each of the plurality of grooves 26 is defined by a pair of tooth form profiles, such as tooth form profiles 25, 25*a*. Tooth form profiles 25, 25*a* extend a predetermined height radially inward to the center of the aperture 24. The cylindrical body 12 can be received in the aperture 24 and the teeth 16 can be individually received in the grooves 26. In the embodiment of the invention shown in the figures the grooves 26 are helical. The die 22 receives a preform 10 shaped as a helical gear. However, the present invention can be practiced with a die having straight grooves for receiving spur gears.

Figure 2:
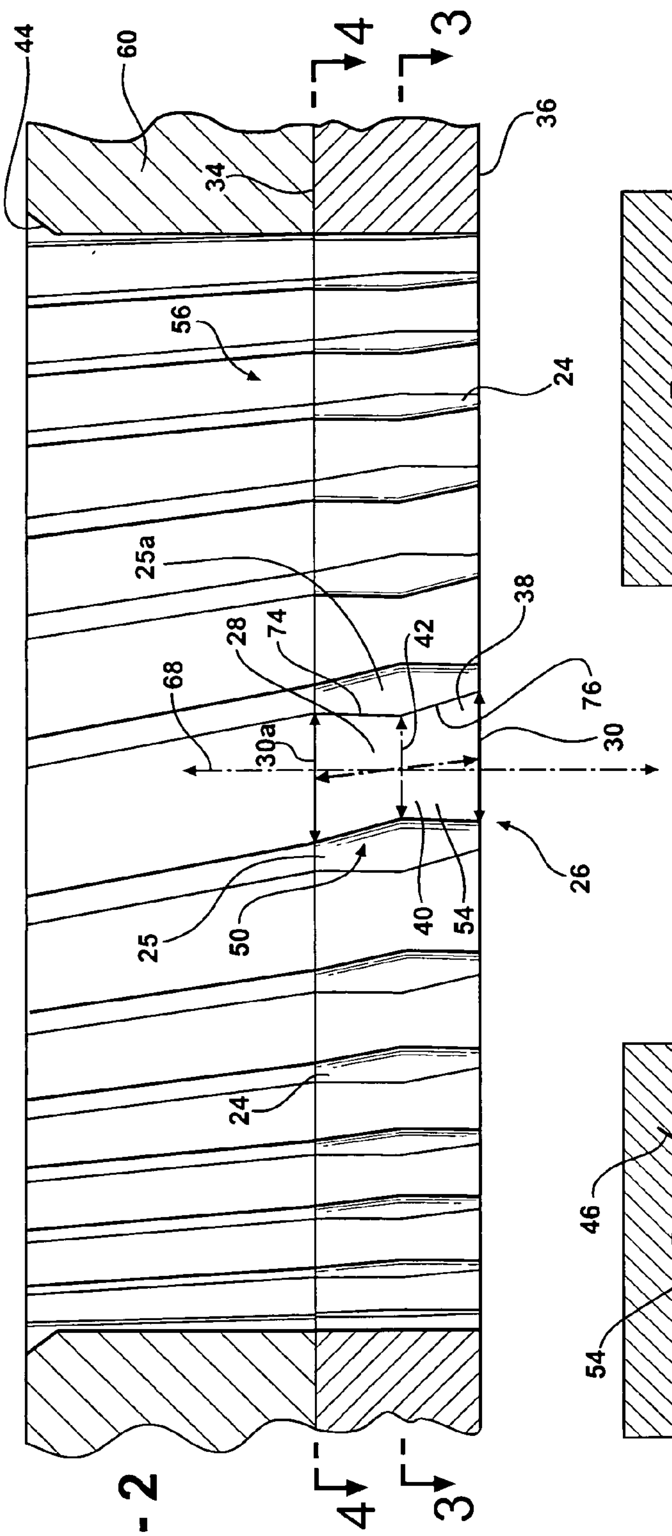
FIG. 2 is a side cross-sectional view of the die shown in FIG. 1.
Figure 3:
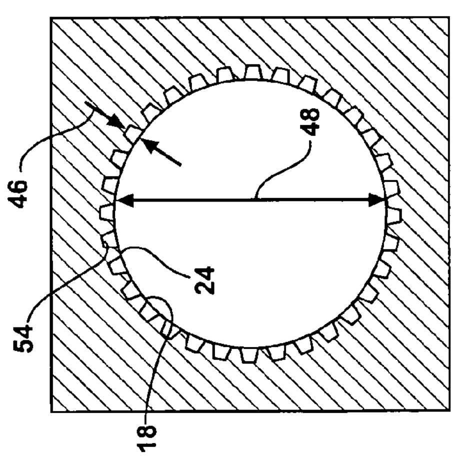
FIG. 3 is a first, top cross-sectional view of the die shown in FIGS. 1–2 wherein the cross section is taken along a plane including the narrowed portions of the grooves.
Figure 4:
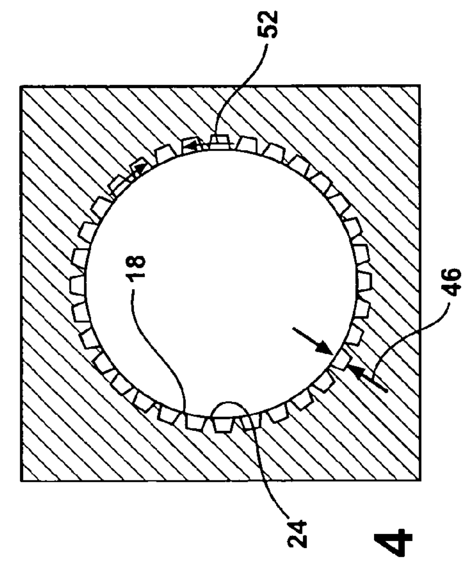
FIG. 4 is a second, top cross-sectional view of the die shown in FIGS. 1–3, wherein the cross-section is taken along a plane including a wider portion of the grooves.

Referring now to FIGS. 2–4, each of the plurality of grooves 26 includes a length 28 defined between the top and bottom surfaces 34, 36. Furthermore, each of grooves 26 defines a depth 46 extending between the aperture 24 and an outer surface 54. The depth 46 can be substantially constant along the length 28. The depth 46 generally corresponds to the height of the teeth 16. The plurality of surfaces 54 define a diameter corresponding to the tip diameter 20.

Each of the grooves 26 also includes a variable width 30, 42 along the length 28. For example, the groove 26 includes a first portion 38 having a first width 30 and a second portion 40 having a second width 42. The width 30 can generally correspond to the width of the teeth 16. The second width 42 is tangentially narrower than the first width 30 with respect to the aperture 24.

The second portion 40 can define an hourglass portion 50. The hourglass portion 50 includes a tapered constricting or ramped or gradually narrowing portion 74, wherein a width 30*a* narrows to the width 42. The hourglass portion 50 also includes a tapered expanding or ramped or gradually widening portion 76, wherein the width 42 widens to a width 30. The widths 30 and 30*a* can be the same or can be different. The hourglass portion 50 can be disposed along the length 28 evenly spaced between the top and bottom surfaces 34, 36.

The aperture 24 and grooves 26, adjacent the top surface 34, define a die opening 56 having an axis 68 for receiving the preform 10. The aperture 24 and the plurality of surfaces 54 are coaxial and extend substantially perpendicular to the top surface 34, and the die 22 is thus a straight-walled die.

Referring now to FIG. 1, in operation the powder metal preform 10 can be operably associated with a punch 58. The punch 58 can move the preform 10 axially and rotationally along the axis 68. The punch 58 rotationally and axially urges the preform 10 through a spacer 60 positioned adjacent the top surface 34. The spacer 60 can facilitate insertion of the preform 10 with respect to the die opening 56 of the die 22. The spacer 60 can also include grooves 62 aligned with the grooves 26 of the die 22 to receive and guide the movement of teeth 16. The spacer 60 can be formed from a relatively softer material than the powder metal preform 10 to reduce the likelihood that the preform 10 would be damaged in the event of misalignment.

The punch 58 rotationally and axially urges the preform 10 through the die 22. A support spacer 64 can be positioned adjacent to the bottom surface 36 to support the die 22 during the movement of the preform 10 through the die 22. The spacer 64 can include grooves 66 aligned with grooves 26 to receive and guide the movement of teeth 16.

During movement of the preform 10 through the die 22, each of the plurality of teeth 16 pass through narrowing portions 42 of the individual grooves 26. The narrowing portions 42 of the grooves 26 correspond to broadening width regions defined by tooth form profiles 25, 25*a* disposed on opposite sides of the grooves 26. The teeth 16 are gradually compressed and deformed during movement along the narrowing portion 74 of the hourglass portion 50. Maximum compression of the teeth 16 occurs at the second portion 40 wherein the width of the teeth 16 corresponds to the second width 42. The second portion 40 acts to transversely displace material of the teeth 16, compression directed tangentially relative to the body portion 12, imparting densification to the teeth 16.

After the teeth pass the second portion 40 during movement along the axis 68, the teeth 16 are permitted to expand tangentially outwardly along the widening portion 76 of the hour glass portion 50 to recover at least some and preferably substantially all of the elastic component of the deformation possessed before encountering the second portion 40. The widening portions 76 of the grooves 26 correspond to narrowing width regions defined by tooth form profiles 25, 25*a* disposed on opposite sides of the grooves 26.

Figure 5:
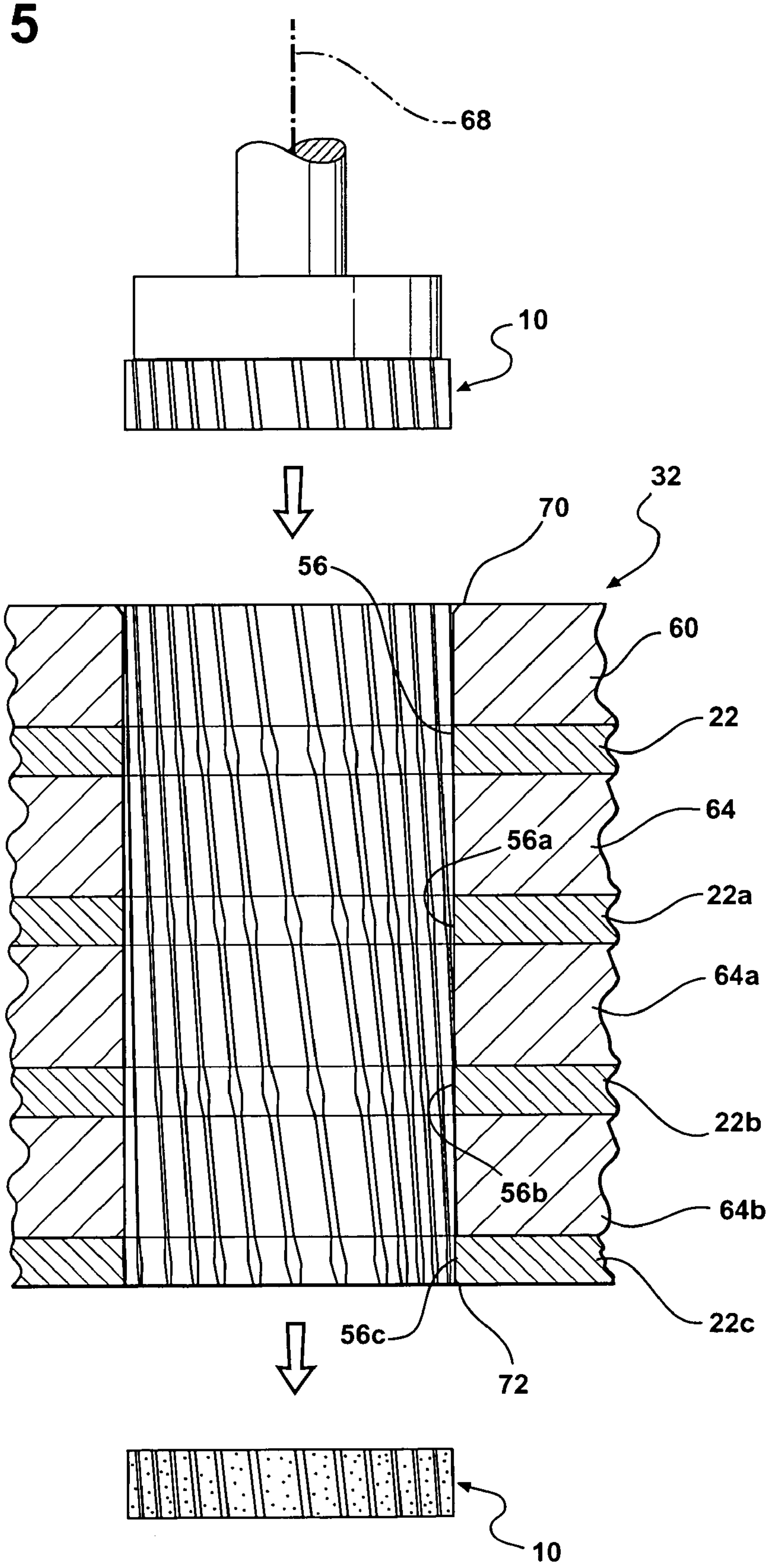
FIG. 5 is a schematic axial sectional view of a multi-stage forming tool including the die shown in FIGS. 1–4 and a plurality of similarly constructed dies.

The die 22 can be incorporated into a multi-stage forming tool as shown in FIG. 5. A plurality of dies 22, 22A, 22B, 22C can be arranged in axially spaced relation with die openings 56, 56A, 56B, 56C disposed concentrically about the axis 68. The die openings 56, 56A, 56B, 56C can have the same general shape but vary in size. For example, the smallest die opening 56 can be disposed at one axial end 70 and a smallest die opening 56C can be disposed at a second axial end 72.

The dies 22, 22A, 22B, 22C can be separated by spacer plates 64, 64A, 64B that fix the dies 22, 22A, 22B, 22C in axially spaced relation. During movement along the axis 68, the preform 10 can be rotated to pass through each of the plurality of dies 22, 22A, 22B, 22C. Furthermore, during movement through any one of the dies 22, 22A, 22B, 22C, the body diameter 14 of the body 12 and the tip diameter 20 of the plurality of tips 18 can be maintained.

Obviously, many modifications and variations of the present invention are possible in light of the above teachings. It is, therefore, to be understood that within the scope of the appended claims, the invention may be practiced otherwise than as specifically described. The invention is defined by the claims.

The invention claimed is:

1. A die for producing powder metal articles comprising:

a top surface;

a bottom surface spaced from said top surface;

an aperture having a diameter and extending between said top and bottom surfaces; and a plurality of continuous helical grooves extending between said top and bottom surfaces radially outwardly from said aperture wherein each of said plurality of grooves has a length and a variable width along said length.

2. The die of claim 1 wherein each of said grooves defines an hour-glass portion along said length.

3. The die of claim 1 wherein said hour-glass portion is disposed evenly spaced between said top and bottom surfaces.

4. The die of claim 1 wherein said diameter is substantially constant between said top and bottom surfaces.

5. A method for producing powder metal articles comprising the steps of:

sintering a compacted powder metal preform having a plurality of teeth;

forcibly moving the powder metal preform axially through first and second dies, each having a die tooth form profile with a broadening width region over at least a lead portion of the profile in the direction of axial movement of the preform and engaging and densifying the teeth of the preform; and moving the powder metal preform axially through an intermediate spacer extending between said dies having a spacer tooth form profile wider than the die tooth form profiles, said spacer tooth form profile extending between said first and second die tooth form profiles forming a plurality of continuous helical grooves.

6. The method of claim 5 including:

guiding the powder metal preform into engagement with the first die with a first spacer having guide teeth extending between the teeth of the preform.

7. The method of claim 6 including:

forming the tooth form profile of the first die along a helix.

8. The method of claim 7 including:

forming the guide teeth of the first spacer along a helix.

9. The method of claim 7 including:

maintaining tip diameters of the teeth of the preform substantially constant during axial movement through the die.

10. The method of claim 7 including:

passing the preform out of the broadening width region and into a narrowing width region defined by the tooth form profile.

11. The method of claim 7 including:

providing a plurality of axially successive intermediate spacers and dies, with the respective tooth form profiles of the dies configures to impart progressively increased densification of the preform teeth.

12. The method of claim 11 including:

aligning the respective tooth form profiles of the plurality of dies and the respective guide teeth of the intermediate spacers along a common axis corresponding to the structure of the teeth of the preform; and forming the respective tooth form profiles of the plurality of dies successively narrower to impact the progressive densification to the teeth of the preform.

13. A die for producing powder metal articles comprising:

a plurality of die sections, each having:

a top surface;

a bottom surface spaced from said top surface;

an aperture having a diameter and extending between said top and bottom surfaces; and a plurality of die grooves extending between said top and bottom surfaces radially outwardly from said aperture wherein each of said plurality of die grooves has a length and a variable width along said length; and a spacer interposed between at least two of said die sections, said spacer having a plurality of spacer grooves in continuous alignment with said die grooves of adjacent die sections.

14. The die of claim 13 wherein each of said die grooves defines an hour-glass portion along said length.

15. The die of claim 14 wherein said hour-glass portion is disposed evenly spaced between said top and bottom surfaces of each of said dies.

16. The die of claim 13 wherein said die grooves are helical.

17. The die of claim 13 wherein said diameter is substantially constant between said top and bottom surfaces.

* * * * *

UNITED STATES PATENT AND TRADEMARK OFFICE

CERTIFICATE OF CORRECTION

PATENT NO. : 7,025,929 B2
APPLICATION NO. : 10/821014
DATED : April 11, 2006
INVENTOR(S) : Juan R.L. Trasorras and Eric T. Riley It is certified that error appears in the above-identified patent and that said Letters Patent is hereby corrected as shown below:

Column 4, line 47, claim 3, "The die of claim 1" should read -- The die of claim 2 --.

Signed and Sealed this

Eleventh Day of July, 2006

JON W. DUDAS

*Director of the United States Patent and Trademark Office*